Aug. 13, 1968            A. JONES            3,396,691
DEVICE FOR EXTENDING AND RETRACTING EQUIPMENT
UNDER ICE SURFACES
Filed Feb. 27, 1967
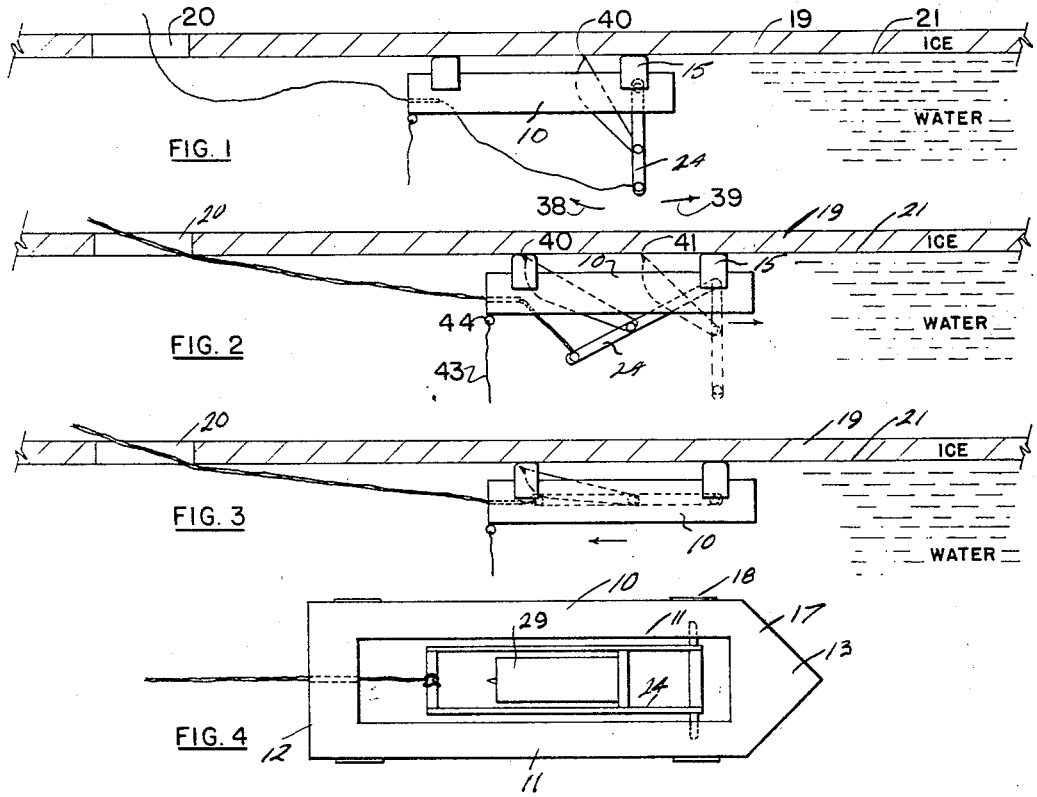
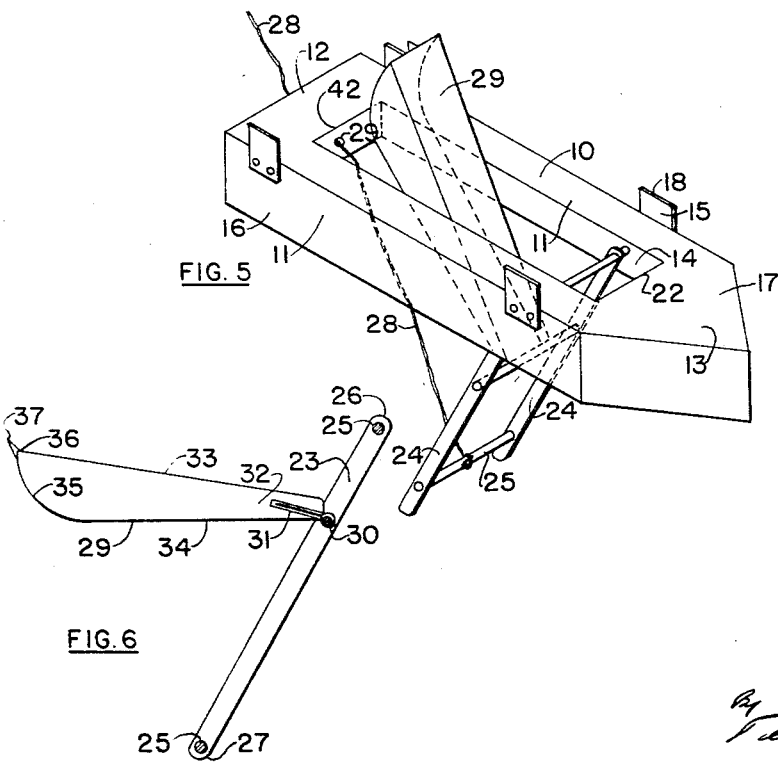
INVENTOR
ARTHUR JONES United States Patent Office 3,396,691
Patented Aug. 13, 1968

3,396,691
DEVICE FOR EXTENDING AND RETRACTING
EQUIPMENT UNDER ICE SURFACES
Arthur Jones, 5720 Roblin Blvd.,
Winnipeg, Manitoba, Canada
Filed Feb. 27, 1967, Ser. No. 618,899
11 Claims. (Cl. 115—.5)

ABSTRACT OF THE DISCLOSURE

Apparatus for step by step propelling of a floating sled under the ice and away from the operator wherein the sled has a rectangular float with a rectangular aperture therein, a non-buoyant three rung ladder pivoted at its upper rung within said aperture, a string attached to the lower rung, and a buoyant ice engaging arm pivoted to the middle rung. Alternate tensioning and releasing of the string causes the arm and ladder linkage and float to inch across the under surface of the ice.

My invention relates to new and useful improvements in devices for extending and retracting equipment under an ice surface covering a body of water.

Although the present device is designed primarily for use in ice fishing, nevertheless it will be appreciated that, being manufactured of a sufficient size, the device could be used for dragging operations or the like.

Ice fishing is extremely popular in the cold weather and usually consists of cutting an aperture within the ice and then still fishing through said aperture.

Devices have been used for fishing between two holes through the ice spaced apart from one another in the form of trolling, but difficulty is encountered in the original setup of the device inasmuch as the line must be passed underwater to the second hole.

The present device overcomes this disadvantage of still fishing through a central hole and disadvantages in extending a line from one hole to another.

The present device can either be used to extend the fishing tackle in any direction from the original hole or, alternatively, can be used to extend the line underwater from one hole to another so that conventional trolling back and forth can take place.

The principal object and essence of the invention is to provide a device of the character herewithin described which can be moved outwardly in any direction from a hole through an ice surface and can then be retrieved readily and easily so that the device is ready for extension again either in the same direction or in another direction.

I accomplish this by having a floatable frame which engages the under surface of the ice and by having a relatively heavy actuating frame pivotally secured and depending downwardly therefrom. A line is secured at the lower end of this frame and extends to the hole through the ice and a floating element extends upwardly to engage the underside of the ice.

By pulling gently on the string the device is moved forwardly by this snagging action of the floatable member with the ice surface and a gentle pulling and releasing action enables the device to "walk" in a direction dependent only on the length of line extending from the device to the hole through the ice.

When it is desired to retract the device, a gentle pull disengages the ice engaging elements so that the device can be slid backwardly to the hole whereupon it is ready for use either in the same direction or in any other direction from the hole.

Another object of the invention is to provide a device of the character herewithin described which is simple in construction, economical in manufacture and otherwise well suited to the purpose for which it is designed.

With the foregoing in view, and such other objects, purposes or advantages as may become apparent from consideration of this disclosure and specification, the present invention consists of the inventive concept in whatsoever way the same may be embodied having regard to the particular exemplification or exemplifications of same herein, with due regard in this connection being had to the accompanying figures in which:

FIGURE 1 is a side view showing the device ready for forward movement.

FIGURE 2 is a view similar to FIGURE 1, but showing the line pulled so that the device has moved forwardly with relation to the position in FIGURE 1.

FIGURE 3 is a view similar to FIGURES 1 and 2, but showing the device in the retrieving position.

FIGURE 4 is a top plan view of the device, but on a larger scale to that shown in the previous figures.

FIGURE 5 is an isometric view of the device.

FIGURE 6 is a sectional view of the actuating components of the device per se.

In the drawings like characters of reference indicate corresponding parts in the different figures.

Proceeding therefore to describe the invention in detail, the device consists of a frame 10 preferably manufactured of wood or of a floatable material. This frame consists of two side members 11, a rear end 12 and a front end 13.

A substantially rectangular slot 14 extends clear through the body portion and lies on the longitudinal axis thereof. The front end 13 is preferably pointed as illustrated to facilitate the maintaining of a straight line as the device is extended.

I have secured a pair of metal or similar material plates 15 to the sides 16 of the frame 10, said plates extending upwardly above the surface 17 of the frame so that the upper edges 18 of these plates are spaced above the upper surface 17.

When the device is placed under the ice sheet 19, through a hole or aperture 20 therethrough, the upper edges 18 of the plate engage the under surface 21 of the ice sheet and maintain the frame in spaced relationship therefrom.

Pivotally secured within the slot 14 and adjacent the front end 22 thereof is an actuating member collectively designated 23. This consists of a pair of side plates 24 maintained in spaced relationship by transverse spacers 25 adjacent the upper ends 26 and 27 respectively.

These side plates are preferably made of metal so that they are non-floating. A pivot pin extends through the upper space 25 and engages within the sides of the slot 14 thus pivotally securing the actuating member within the slot. It will therefore be appreciated that when the device is placed under the ice sheet, this actuating member will normally hang vertically by gravity.

An actuating line 28 is secured to the bottom transverse member 25 and extends into the slot 14 and through an aperture 29' drilled through the end 12. This line 28 then extends to the aperture or hole 20 formed through the ice and is held by the operator.

An under ice surface engaging means collectively designated 29 is provided and is shown in detail in FIGURES 5 and 6. This is preferably made of wood so that the means 29 floats and it is pivotally secured to the actuating member as shown in FIGURE 6. A rod 30 extends between the plates 24 in a position substantially towards the upper ends 26 thereof. A pivot plate 31 extends around rod 30 and is held within the end 32 of the component 29. This component includes an upper planar surface 33 and a lower planar surface 34 both of which diverge from the end 32 of the device. The lower surface 34 then curves upwardly as at 35 to meet the upper surface at junction 36. A tang, preferably made of metal, and identified by reference character 37 is secured to this junction 36 and extends upwardly and outwardly therefrom as clearly illustrated.

When the actuating member 23 is hanging vertically as shown in FIGURE 1, the floatable component 29 floats upwardly pivoting around rod 30 until tang 37 engages the under surface 21 of the ice sheet as illustrated in FIGURE 1.

If the cord or line 28 is then pulled gently, actuating member moves in an arc in the direction of arrow 38. The tang digs into the under surface 21 and this forces the frame outwardly from the hole and in the direction of arrow 39 until the actuating member is in the position shown in full line in FIGURE 2. It will be noted that tang 37 engages the under surface of the ice at a point 40 and that this point of engagement is similar in both FIGURES 1 and 2, whereas the frame has moved outwardly.

The line 28 is then relaxed thus enabling the actuating component to hang vertically again thus drawing the tang along the under surface of the ice to a new position illustrated in FIGURE 2 in phantom by reference character 41.

The process is repeated with a reciprocating motion so that the device moves outwardly as far as desired.

When it is desired to retrieve the device, the line 28 is tightened to the extent that the actuating member 23 is drawn upwardly within the slot 14 and enclosed by the frame as shown in phantom in FIGURE 3. Under these conditions, the member 29 lies with the curved surface 35 resting upon the edge 42 of the rear end of the slot 14 and the tang 37 is below the upper edges 18 of the runner plates 15 so that the tang is not engaged within the ice and the device can be pulled rearwardly towards the hole 20. However, as soon as the actuating member is dropped to the vertical position, the tang once again engages the undersurface 21 of the ice sheet.

The shape and location of the member 29 prevents the tang 37 from engaging the ice surface only when the actuating member is parallel to and residing in slot 14.

Equipment in the form of fishing tackle 43 may be suspended from wing 44 secured to the underside rear of the frame 10 and the fishing tackle can either take the form of an artificial lure or natural bait as desired.

If a fish is caught, no trouble is encountered in striking and retrieving the fish with the line 28.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. A device for extending and retracting equipment under an ice surface from an aperture through said ice surface comprising in combination a floatable frame, under surface ice engaging runners on the upper surface of said frame, said frame including side portions, and end portions defining a substantially longitudinally extending rectangular slot through said frame, a non-floatable actuating member pivotally secured by one end thereof within said slot and substantially towards the front end thereof, an actuating line extending from the other end of said member, a floatable under ice surface engaging means pivotally secured by one end thereof intermediate the ends of said member.

2. The device according to claim 1 in which said member comprises an open substantially rectangular frame including a pair of spaced and parallel side plates, transverse spacers spanning adjacent ends of said plates, said engaging means being pivotally secured between said plates at a point towards the pivotal securement of said one end to said frame.

3. The device according to claim 1 in which said engaging means comprises a pivot plate, a rod spanning said member, said pivot plate surrounding said rod and a floatable portion secured by one end thereof to said pivot plate, the upper surface of said portion being substantially planar, the lower surface diverging outwardly and downwardly from said upper surface and from said one end, and curving upwardly to meet said upper surface at said other end.

4. The device according to claim 2 in which said engaging means comprises a pivot plate, a rod spanning said member, said pivot plate surrounding said rod and a floatable portion secured by one end thereof to said pivot plate, the upper surface of said portion being substantially planar, the lower surface diverging outwardly and downwardly from said upper surface and from said one end, and curving upwardly to meet said upper surface at said other end.

5. The device according to claim 3 which includes a tang secured to the junction of said upper and lower surfaces of said other end and extending outwardly and upwardly therefrom.

6. The device according to claim 4 which includes a tang secured to the junction of said upper and lower surfaces of said other end and extending outwardly and upwardly therefrom.

7. The device according to claim 1 in which said under surface ice engaging runners comprise planar plates secured to each side of said frame and extending upwardly therefrom, the upper edges of said plates being above the upper surface of said frame whereby engagement of said upper edges with the under surface of said ice maintains said frame in spaced relationship below said ice.

8. The device according to claim 2 in which said under surface ice engaging runners comprise planar plates secured to each side of said frame and extending upwardly therefrom, the upper edges of said plates being above the upper surface of said frame whereby engagement of said upper edges with the under surface of said ice maintains said frame in spaced relationship below said ice.

9. The device according to claim 3 in which said under surface ice engaging runners comprise planar plates secured to each side of said frame and extending upwardly therefrom, the upper edges of said plates being above the upper surface of said frame whereby engagement of said upper edges with the under surface of said ice maintains said frame in spaced relationship below said ice.

10. The device according to claim 4 in which said under surface ice engaging runners comprise planar plates secured to each side of said frame and extending upwardly therefrom, the upper edges of said plates being above the upper surface of said frame whereby engagement of said upper edges with the under surface of said ice maintains said frame in spaced relationship below said ice.

11. The device according to claim 5 in which said under surface ice engaging runners comprise planar plates secured to each side of said frame and extending upwardly therefrom, the upper edges of said plates being above the upper surface of said frame whereby engagement of said upper edges with the under surface of said ice maintains said frame in spaced relationship below said ice, said tang being situated below said upper surfaces when said actuating member is within said slot and enclosed by said frame.

References Cited

UNITED STATES PATENTS

| | | | |
|---|---|---|---|
| 2,509,323 | 5/1950 | Underhill | 115—0.5 |
| 3,268,174 | 8/1966 | Boone | 280—12.11 |

ANDREW H. FARRELL, *Primary Examiner.*